G. W. LUCAS.
FISHHOOK FISHING MACHINE.
APPLICATION FILED MAR. 7, 1921.
1,383,474.
Patented July 5, 1921.
2 SHEETS—SHEET 2.
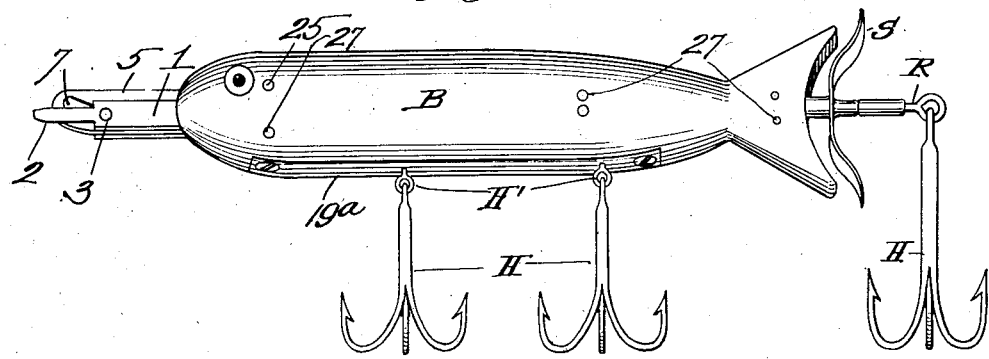
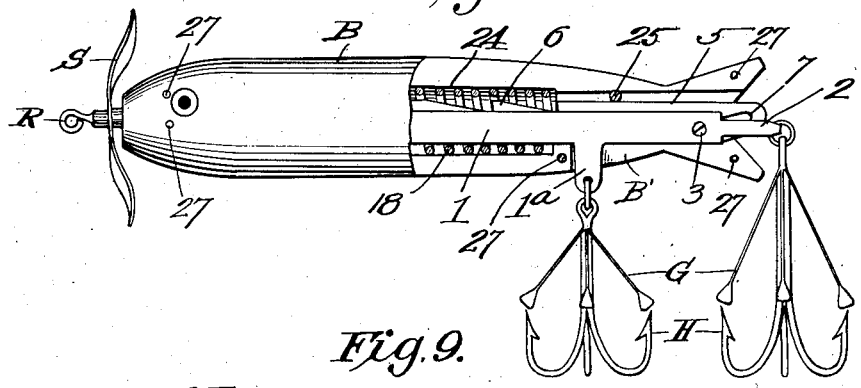
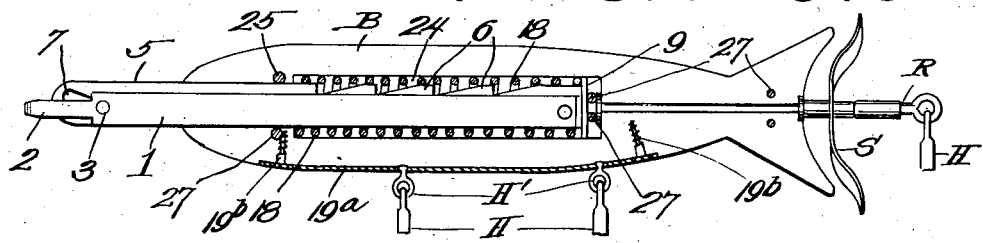
Witnesses
Frank R Glove
James A Rasbach
Inventor
George W. Lucas
By Thorpe Gerard Attys.

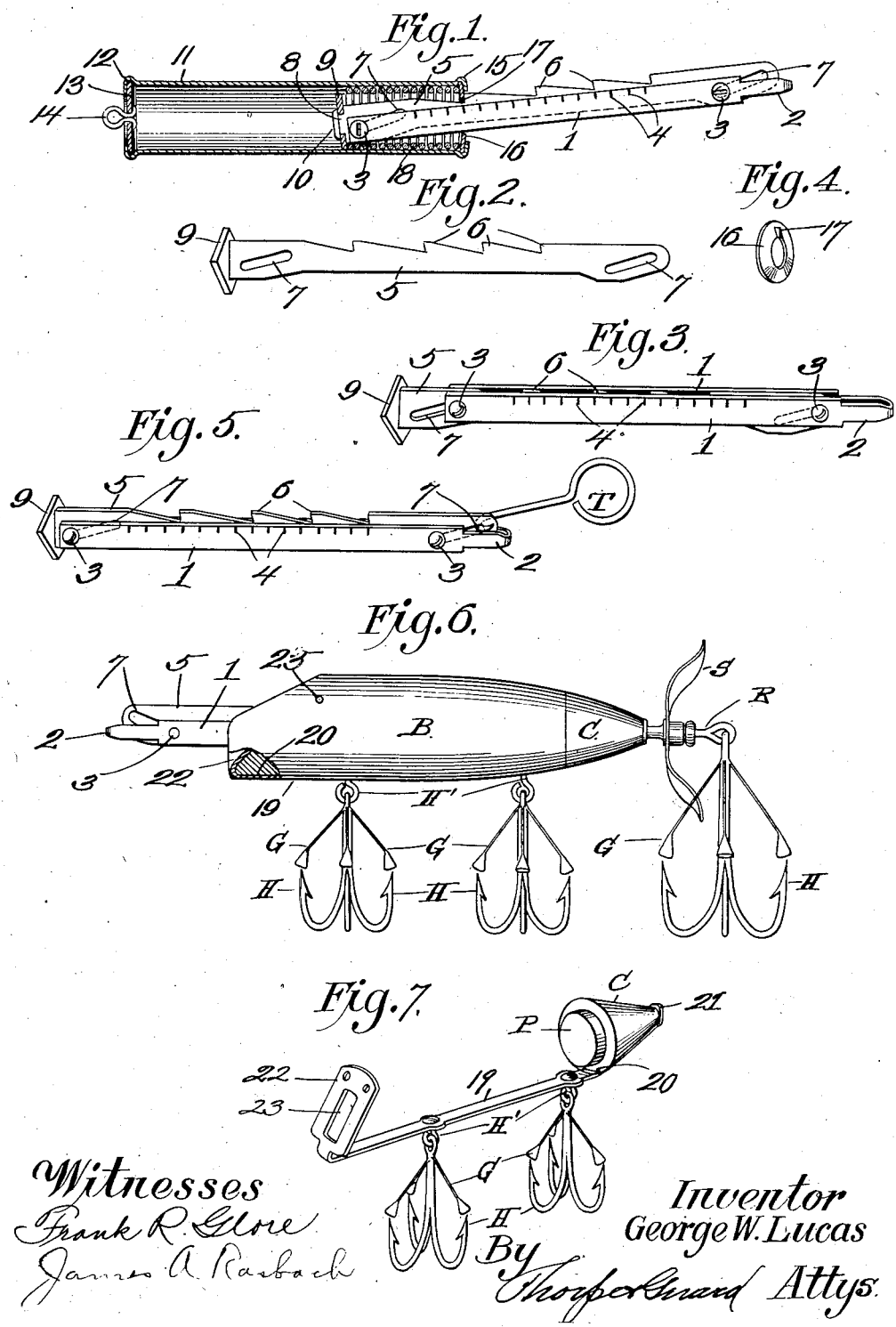

UNITED STATES PATENT OFFICE.

GEORGE W. LUCAS, OF KANSAS CITY, MISSOURI.

FISHHOOK FISHING-MACHINE.

1,383,474.  Specification of Letters Patent.  Patented July 5, 1921.

Application filed March 7, 1921. Serial No. 450,394.

*To all whom it may concern:*

Be it known that I, GEORGE W. LUCAS, a citizen of the United States, and resident of Kansas City, county of Jackson, State of Missouri, have invented a certain new and useful Improvement in Fishhook Fishing-Machines, of which the following is a complete specification.

This invention relates to fish hook fishing machines, and more especially to that class of devices adapted when a fish applies a pull on a hook, to jerk the latter forward in a manner analogous to the jerking of a line by hand to hook the fish, and my primary object is to produce a device of this character which will operate efficiently and in quick response to the pull applied by a fish upon the hook. A further object is to produce a device of this character adjustable to impart a jerk on the hook of different degrees of strength so that the device can be used for efficiently hooking various kinds of fish. A still further object is to produce a device susceptible of application as a lure, that is in the form of a bait for particular kinds of fish which it is desired to catch. A still further object is to produce a device of this character peculiarly suitable for use with different kinds of hooks, and another object is to produce a device of the character referred to which is of simple, strong, durable and inexpensive construction.

With these objects in view the invention consists in certain novel and useful features of construction and combinations of parts as hereinafter described and claimed; and in order that it may be fully understood reference is to be had to the accompanying drawings, in which:—

Figure 1 is a central longitudinal section of a fish hook fishing machine embodying the invention.

Fig. 2 is a ratchet toothed rack bar forming a part of the device.

Fig. 3 is a detail perspective view of said rack bar and a tripping bar or trigger therefor.

Fig. 4 is a detail perspective view of a catch forming part of the device.

Fig. 5 is a perspective view of the rack bar and tripping bar or trigger in different relative positions from those shown by Fig. 3, and also shows a device engaged with the rack bar for "cocking" or setting the same in operative position.

Fig. 6 is a side view of a bait or lure simulating a fish and mounted upon the device.

Fig. 7 is a detail perspective view disclosing parts of said bait or lure shown by Fig. 6, together with a guide hidden in Fig. 6, for the device.

Fig. 8 is a side view of another lure simulating a fish and mounted upon the device.

Fig. 9 is a central vertical longitudinal section of the bait or lure disclosed by Fig. 8.

Fig. 10 is a view partly in side elevation and partly in central vertical longitudinal section of another form of bait or lure and also shows a modified form of the construction of the device.

Referring now to the drawings where like reference characters indicate corresponding parts in all of the figures, 1 indicates a tripping bar or trigger, comprising two parallel members connected together at one end by an integrally formed loop 2, and near their opposite ends by cross pin screws 3, and said members are formed with scale markings 4.

A bar 5, provided along one edge with a plurality of ratchet-shaped teeth 6, fits snugly between the members 1 of the trigger, and is provided with a pair of parallel slots 7 extending at an angle to the longitudinal axis of the rack bar. At one end said rack bar is provided with a reduced portion or neck 8 extending through a head 9, the extremity of the reduced portion or neck being upset to form a head 10 to secure the head 9 firmly in place. The head 9 is preferably of angular form in contour and forms a plunger for a cylindrical casing 11, the form of the plunger or head 9 being such that it shall operate within the casing with a minimum of friction by touching the casing at spaced points only, and therefore avoid pocketing water within the latter to interfere with the line-jerking operation desired when a fish, by pulling on the rack bar trigger as hereinafter explained, trips the rack bar from engagement with a catch hereinafter mentioned.

The front end of the casing is formed with teeth 12 for receiving and firmly holding a head 13 equipped with an eye 14 to which is attached the line leading to the fisherman's hand reel or pole. The opposite or rear end of the casing is likewise provided with a bead 15 for securing and holding firmly in place a centrally perforated dished head 16 constituting a catch for the rack bar, the said dished head being formed at the edge of its opening with a reduced portion 17 for engagement by either of the teeth 6 of the rack bar, in order to facilitate the disengagement of the latter therefrom.

Arranged within the casing and circumscribing the rack bar and trigger and bearing at its opposite ends against the catch 16 and the head 9, is an expansion spring 18, the same being so gaged as to strength or resistance that when the trigger and rack bar are pulled rearward, the scale marks on the trigger when opposite the catch, will indicate in pounds or fractions thereof the tension upon the compressed spring.

A section of line which is preferably weaker than that to be attached to the eye 14, is adapted to be attached to the looped end 2 of the trigger, and equipped in the customary manner with a sinker, and with a hook or hooks, and may also be equipped with a float. The line when pulled by a fish tugging at the hook, will effect relatively upward and rearward movement of the trigger because of the slots 7 engaged by pins 3, and thus cause the trigger by bearing against the edge of the catch 16 at opposite sides of the reduced portion 17, to force the rack bar relatively downward and forward and thus trip the engaged tooth from engagement with the catch. As this occurs the spring 18 will project the trigger and rack bar conjointly forward by its pressure on the head 9, and thus impart a jerk to the hook-carrying end of the line for hooking the fish, the force of the jerk being of course proportioned to the position of the rack bar with respect to the catch 16. For large fish the device will be set substantially as shown in Fig. 1, and for smaller fish the teeth of the rack bar nearer the rear end thereof will be engaged with the catch, the pull of the tensioned spring in each case being apparent by an inspection of the scale marking on the trigger. In all cases it will be apparent by reference particularly to Fig. 3, that when the trigger effects the tripping of the rack bar from engagement with the catch, said bar will occupy the position in which its teeth are flush with the upper edge of the trigger so that the trigger and rack bar are free to slide forward within the casing without any possibility of the engagement of any of the teeth of the rack bar with the catch.

In Fig. 6, B and C indicate parts of a lure or bait for bass and similar fish, the part C having a reduced plug portion P fitting within the rear end of part B and secured in position in any suitable manner. For effecting such securement or for aiding in securing the parts together, a metal bar 19 fits in a channel 20 formed in the lower side of parts B and C, and as its rear end terminates in an upwardly projecting perforated eye 21 covering the rear end of part C and forming a bearing for a rod R, equipped with a hook H, which hook may be provided with a guard G, if desired, and rotatably mounted on said rod is a spinner S, so formed that when the bait is drawn through the water the spinner will revolve for the attraction of fish. At its front end bar 19 is formed with an upwardly and rearwardly extending portion 22, which is preferably wider than the bar and stands within the front end of the bait, and is provided with a guide opening 23 for slidingly receiving the trigger and rack bar. In this construction a cross pin 25 constitutes the catch for engagement by any of the teeth 6, the spring 18, not shown in Fig. 6, but arranged as shown in Fig. 9, acting to project the rack bar farther into the bait (or casing) to effect the "hooking" action.

In Figs. 8 and 9, the device occupies a chamber 24, and the pin 25 constitutes the catch, and in conjunction with pin 26 serves as a guide in place of the slot 23 of Fig. 7, and said pins 25 and 26, in conjunction with two sets of pins 27, serve to hold the two halves of the bait together, the bait in this instance being split longitudinally into two halves instead of transversely as in Fig. 6. In this construction there is also provided the rod R, spinner S and hook H, the latter preferably lacking the guard G, if for deep sea fishing, and to aid in securing the two halves of the bait together and for the support of extra hooks, a plate 19ª is set in and secured by screws 19ᵇ, to said halves. The extra hooks H are attached to swiveled eyes secured to the bar. The bait or lure shown by Figs. 8 and 9, is adapted for fishing for tarpon or other powerful game fish.

In Fig. 10 another form of bait or lure is shown. In this the spinner is disposed at the head end of the lure, and the device protrudes from the tail end thereof, and the lure is made in halves secured together by cross pins 25 27, the cross pin 25 serving as the catch. In this case the trigger 1 has a depending lug 1ª from which is suspended a hook, and the adjacent inner faces of the halves to accommodate the lug 1ª when the trigger is tripped and the "jerk" occurs, is recessed or slotted at B. In this construction the looped end of the trigger is shown as equipped with a hook, and hence will not be equipped with the line referred to particularly, in the description of Fig. 1. This form is adapted for long range casting, as customary in fishing for muscallonge, pickerel, etc. The arrangement of the device as shown by Figs. 1 and 10 is obvious. In the arrangements in which the line leading from the lure to the angler, is attached to the looped portion 2 as in Figs. 6, 8 and 9, the tug or pull of a fish upon a hook, resisted by such line, results in a downward and rearward movement of the lure or casing and the rack-bar 5, until the upper edges of the latter and the trigger are flush, and as this relation of said parts is established, the rack-bar is tripped from pin 25, and spring 18 effects forward movement of the lure or casing to hook the fish.

The types of lure shown by Figs. 6, 8 and 10, are respectively designed more especially for long casting, deep sea fishing and casting in lakes or other water where the chances of entanglement with weeds is always present.

From the above description, it will be apparent that while I have shown and described what I now regard as the preferred forms of construction for embodying the proposed improvements, I desire to reserve the right to make such changes or modifications as may fairly fall within the scope of the following claims.

I claim:

1. A fish hook fishing device, comprising a casing having a catch, a rack-bar extending longitudinally of the casing and provided within the latter with a head, and when "cocked", having a tooth engaging the catch, a trigger fitted flatly against the rack-bar and slidably connected thereto for simultaneous movement under the pull or jerk of a fish, away from the head and upward toward the toothed edge of the rack-bar and against the catch to trip the rack-bar from engagement with the catch, and a spring within and bearing against the casing and the head of the rack-bar for projecting the latter and the trigger further within the casing when the rack-bar is tripped by the trigger.

2. A fish hook fishing device, comprising a casing having a catch, a rack-bar extending longitudinally of the casing and provided within the latter with a head, and also provided along its upper edge with a series of ratchet teeth, and when "cocked" having one of its teeth engaging the catch, a trigger fitted flatly against the rack-bar and slidably connected thereto and provided with scale markings and adapted for simultaneous movement under the pull or jerk of a fish, away from the head and upward toward the toothed edge of the rack-bar and against the catch to trip the rack-bar from engagement with the catch, and a spring within bearing against the casing and the head of the rack-bar for projecting the latter and the trigger further within the casing when the rack-bar is tripped by the trigger.

3. A fish hook fishing device, comprising a casing having a catch, a rack-bar extending longitudinally of the casing and provided within the latter with a head, and when "cocked" having a tooth engaging the catch, a trigger comprising two parts fitted flatly against opposite sides of the rack-bar and provided with a loop at the non-headed end of the latter and slidably connected to the rack-bar for simultaneous movement under the pull or jerk of a fish, away from the head and toward the toothed edge of the rack-bar and against the catch to trip the rack-bar from engagement with the catch, and a spring within the casing and encircling the rack-bar and trigger and bearing against the casing and the head of the rack-bar for projecting the latter and the trigger further within the casing when the rack-bar is tripped by the trigger.

4. A fish hook fishing device, comprising a casing having a catch, a rack-bar extending longitudinally of the casing and provided within the latter with a head, and with a tooth, which when the rack-bar is "cocked" engages the catch, and provided near its ends with parallel slots extending obliquely, a trigger fitted flatly against the opposite sides of the rack-bar and provided with pins extending through said slots, and adapted for simultaneous movement under the pull or jerk of the fish, away from the head and up toward the toothed edge of the rack-bar and against the catch to trip the rack-bar from engagement with the catch, and a spring within and bearing against the casing and the head of the rack-bar for projecting the latter and the trigger further within the casing when the rack-bar is tripped by the trigger.

5. A fish hook fishing device, comprising a casing having a catch, a rack-bar extending longitudinally of the casing and provided within the latter with a head, and with a tooth, which when the rack-bar is "cocked", engages the catch, a trigger fitted flatly against the rack-bar and slidably connected thereto for simultaneous movement under the pull or jerk of a fish, away from the head and upward toward the toothed edge of the rack-bar and against the catch to trip the rack-bar from engagement with the catch, and a spring within and bearing against the casing and the head of the rack-bar for projecting the latter and the trigger further within the casing when the rack-bar is tripped by the trigger.

6. A fish hook fishing device, comprising a casing having a catch, and a spinner, and simulating a fish in appearance, a rack-bar extending longitudinally of and into said casing and provided within the latter with a head, and when "cocked", having a tooth engaging the catch, a trigger fitted flatly against the rack-bar and slidably connected thereto for simultaneous movement under the pull or jerk of a fish, away from the head and upward toward the toothed edge of the rack-bar and against the catch to trip the rack-bar from engagement with the catch, and a spring within and bearing against the casing and the head of the rack-bar for projecting the latter and the trigger further within the casing when the rack-bar is tripped by the trigger.

In witness whereof I hereunto affix my signature.

GEORGE W. LUCAS.